United States Patent
Ma et al.

(10) Patent No.: US 7,995,055 B1
(45) Date of Patent: Aug. 9, 2011

(54) CLASSIFYING OBJECTS IN A SCENE

(75) Inventors: Xiaoxu Ma, Cambridge, MA (US);
Lingyun Liu, Elmhurst, NY (US);
Daniel Filip, San Jose, CA (US); Luc Vincent, Palo Alto, CA (US);
Christopher R. Uhlik, Danville, CA (US)

(73) Assignee: Google Inc., Mountain View, CA (US)

( * ) Notice: Subject to any disclaimer, the term of this patent is extended or adjusted under 35 U.S.C. 154(b) by 563 days.

(21) Appl. No.: 11/753,859

(22) Filed: May 25, 2007

(51) Int. Cl.
*G06T 17/00* (2006.01)
*G06K 9/00* (2006.01)

(52) U.S. Cl. ..................................... 345/420; 382/154
(58) Field of Classification Search ................ None
See application file for complete search history.

(56) References Cited

U.S. PATENT DOCUMENTS

| | | | |
|---|---|---|---|
| 5,821,943 A | 10/1998 | Shashua | |
| 6,701,005 B1 | 3/2004 | Nichani | |
| 6,911,995 B2 | 6/2005 | Ivanov et al. | |
| 7,103,213 B2 | 9/2006 | Hirvonen et al. | |
| 7,149,677 B2* | 12/2006 | Jayaram et al. | 703/22 |
| 2002/0106135 A1 | 8/2002 | Iwane | |
| 2003/0023614 A1 | 1/2003 | Newstrom et al. | |
| 2003/0147553 A1* | 8/2003 | Chen et al. | 382/154 |
| 2004/0051711 A1* | 3/2004 | Dimsdale et al. | 345/419 |
| 2004/0184655 A1 | 9/2004 | Ziegler et al. | |
| 2005/0031329 A1 | 2/2005 | Krumm | |
| 2006/0047471 A1 | 3/2006 | Krumm | |
| 2006/0061566 A1 | 3/2006 | Verma et al. | |
| 2007/0280528 A1* | 12/2007 | Wellington et al. | 382/154 |
| 2008/0111815 A1* | 5/2008 | Graves et al. | 345/420 |

OTHER PUBLICATIONS

C. Bauckhage. Tree-based signatures for shape classification. In Proceedings of the IEEE International Conference on Image Processing (ICIP), pp. 2105-2108, 2006.*
Jain, A. K., Murty, M. N., and Flynn, P. J. 1999. Data clustering: a review. ACM Comput. Surv. 31, 3 (Sep. 1999), 264-323. DOI=http://doi.acm.org/10.1145/331499.331504.*
Wang, Z. & Schenk, T. (2000) "Building Extraction and Reconstruction from LIDAR Data", In proceedings of IAPRS, July, vol. 33, part B3, p. 958-964.*
Christopher Jaynes, Edward Riseman, and Allen Hanson. 2003. Recognition and reconstruction of buildings from multiple aerial images. Comput. Vis. Image Underst. 90, 1 (Apr. 2003), 68-98.*
A Tutorial on Clustering Algorithms [online]. [retrieved on Oct. 26, 2006]. Retrieved from the Internet: <URL: www.elet.polimi.it/upload/matteuce/Clustering/tutorial_html/kmeans.html> 3 pages.
Burges, Christopher, "A Tutorial on Support Vector Machines for Pattern Recognition," *Data Mining and Knowledge Discovery*, 2, 121-167, 1998, 48 pages.
Csurka, et al. "Visual Categorization with Bags of Keypoints," *Xerox Research Center Europe*, 16, 2004, 16 pages.

(Continued)

*Primary Examiner* — Daniel F Hajnik
(74) *Attorney, Agent, or Firm* — Fish & Richardson P.C.

(57) ABSTRACT

In some implementations, a computer-implemented method of classifying image data includes receiving a plurality of data points corresponding to three-dimensional image data; creating from the plurality of data points a first subset of data points that are above a ground plane in a scene represented by the plurality of data points; identifying a second subset of data points associated with an object in the scene, from the first subset of data points; identifying a plurality of features associated with the second subset of data points and determining a signature for the identified plurality of features; and classifying the second set of data points according to a correspondence between the calculated signature and a reference signature.

57 Claims, 11 Drawing Sheets

OTHER PUBLICATIONS

Data Clustering from Wikipedia [online]. [retrieved on Oct. 26, 2006]. Retrieved from the Internet: <URL: http://en.wikipedia.org/wiki/Data_clustering> 11 pages.

Deng, et al., "Construction 3D Urban Model from LIDAR and Image Sequence," *The International Archives of the Photogrammetry, Remote Sensing and Spatial Information Sciences*, Jul. 12-23, 2004, vol. 34, Part XXX, available at http://www.isprs.org/istanbul2004/, 4 pages.

Frueh et al., "3D Model Generation for Cities Using Aerial Photographs and Ground Level Laser Scans," *IEEE Conference on Computer Vision and Pattern Recognition*, Kauai, USA 2001, pp. 11-31-38, vol. 2.2, 8 pages.

Hu, et al. "Approaches to Large-Scale Urban Modeling," *IEEE Computer Graphics and Applications*, Nov./Dec. 2003, 8 pages.

Johnson et al., "Using Spin Images for Efficient Object Recognition in Cluttered 3D Scenes," *IEEE Transactions on Pattern Analysis and Machine Intelligence*, vol. 21, No. 5, May 1999, pp. 433-449, 17 pages.

Lombardi, et al. "Unified Stereovision for Ground, Road, and Obstacle Detection," Intelligent Vehicles Symposium, 2005. Proceedings. IEEE, Jun. 6-8, 2005, 6 pages.

Madhavan, et al. "Robust Detection and Recognition of Buildings in Urban Environments fro LADAR Data," *Proceedings of the 33rd Applied Imagery Pattern Recognition Workshop (AIP 2004)* 6 pages.

Nguyen et al.. Kernel Matrix Evaluation, *IJCAI-07*, Jan. 6-12, 2007, pp. 987-992, available at http://www.informatik.uni-trier.de/~ley/db/conf/ijcai/ijcai2007.html#NguyenH07, 6 pages.

Rubner et al., "A Metric for Distribution with Applications to Image Databases," *Proceedings of the 1998 IEEE International Conference on Computer Vision*, Bombay, India, 8 pages.

Rubner et al., "The Earth Mover's Distance as a Metric for Image Retrieval," *International Journal of Computer Vision* 40(2), 99-121, 2000, 23 pages.

Thesis of Andrew Edie Johnson, "Spin-Images: A Representation for 3-D Surface Matching,", Aug. 13, 1997, 308 pages.

UCLA Urban Simulation Laboratory Receives First Delivery of SGI InfiniteReality4, Available at http://www.sgi.com/company_info/newsroom/press_releases/2002/july/ucla.html, retrieved Oct. 16, 2006, 2 pages.

UCLA-Urban Stimulation Team at UCLA, Available at http://www.ust.ucla.edu, retrieved Oct. 16, 2006, 3 pages.

UCLA-Urban Stimulation Team Members—About Us, Available at http://www.ust.ucla.edu/ustweb/team.html, retrieved Oct. 16, 2006, 1 page.

UCLA-Urban Stimulation Team—About Us, Available at http://www.ust.ucla.edu/ustweb/about_us.html, , retrieved Oct. 16, 2006, 4 pages.

Zhang et al., "Constructing 3D Reality Models of Urban Scenes from Ground-Based Synchronized Laser Data and Visual Data," *Proceedings of the 7th IASTED International Conference*, Computer Graphics and Imaging, Aug. 17-19, 2004, Kaua, Hawaii, USA, 6 pages.

Zhang et al., "Local Features and Kernels for Classification of Texture and Object Categories: An In-Depth Study," *INRIA* Oct. 2005, 42 pages.

Zhang et al., "Constructing 3D Reality Models of Urban Scenes from Ground-Based Synchronized Laser Data and Visual Data," from *Proceedings (426) Computer Graphics and Imaging—2004*, Available at http://www.actapress.com/PaperInfo.aspx?PaperID=16935 retrieved Oct. 16, 2006, 1 page.

\* cited by examiner

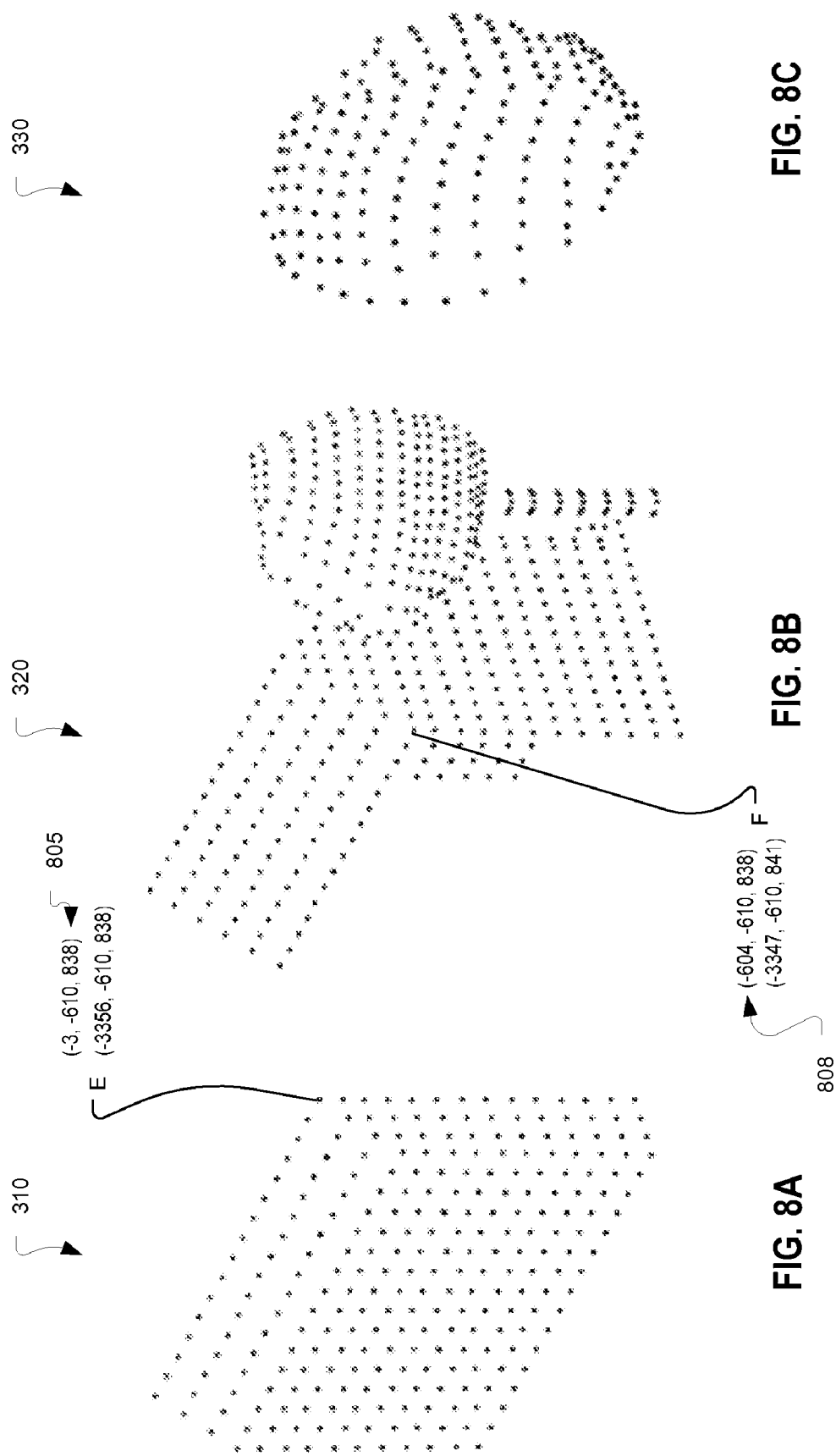

| Actual Class \ Predicted Class | Vehicle (Side) | Tree | Building | Pole | Building (Fragment) | Vehicle (Rear) | Shrub |
|---|---|---|---|---|---|---|---|
| Vehicle (Side) | 92.71 <br> 1305 | 0.07 | 0.00 | 0.00 | 3.75 <br> 1308 | 2.64 | 0.83 |
| Tree | 0.96 | 75.77 <br> 1311 | 0.00 | 0.00 | 0.00 | 1.54 | 21.73 <br> 1314 |
| Building | 0.00 | 0.00 | 95.78 | 0.00 | 3.59 | 0.00 | 0.62 |
| Pole | 0.00 | 0.00 | 0.00 | 97.67 | 0.00 | 2.33 | 0.00 |
| Building (Fragment) | 0.51 | 0.00 | 7.35 | 0.31 | 85.00 | 1.73 | 5.10 |
| Vehicle (Rear) | 1.82 | 0.00 | 0.00 | 0.91 | 0.45 | 83.64 | 13.18 |
| Shrub | 0.00 | 20.00 | 0.00 | 0.00 | 0.00 | 2.50 | 77.50 |

CLASSIFYING OBJECTS IN A SCENE

BACKGROUND

Various applications model digital three-dimensional models of urban scenes. Such models can be used, for example, to facilitate easy manipulation of the scenes in a digital computing environment. For example, city planning commissions or real estate developers may use digital models to visualize how different development options would appear in the context of existing surroundings. As another example, emergency response teams may use digital models of various portions of a city to develop comprehensive response strategies for various disasters or events affecting large numbers of people. As another example, movie or game developers may use digital models in place of actual video footage to develop various scenes.

In some implementations, the digital models are created by scanning or digitizing actual scenes and extracting individual objects from the digitized scenes. Models of the individual objects can then be used to recreate the actual scenes digitally—for example, to facilitate visualization of changes to the scene, or to create a library of objects from which new scenes can be built.

SUMMARY

In some implementations, a computer-implemented method of classifying image data includes receiving a plurality of data points corresponding to three-dimensional image data; creating from the plurality of data points a first subset of data points that are above a ground plane in a scene represented by the plurality of data points; identifying a second subset of data points associated with an object in the scene, from the first subset of data points; identifying a plurality of features associated with the second subset of data points and determining a signature for the identified plurality of features; and classifying the second set of data points according to a correspondence between the calculated signature and a reference signature.

Creating the first subset of data points can include identifying ground plane data points in the plurality of data points and extracting the ground plane data points from the plurality of data points to create the first subset of data points. Identifying ground plane data points can include a) identifying candidate ground plane data points in the plurality of data points; b) fitting a plane to the candidate ground plane data points; c) determining, using the fitted plane, a probability that points in the candidate ground plane data points are associated with the ground plane in the scene; and d) removing data points from the candidate ground plane data points whose corresponding determined probability is lower than a threshold probability. In some implementations, actions a) to d) are repeated a predetermined number of times. In some implementations, actions a) to d) are repeated until a current fitted plane is within a threshold distance of a previously fitted plane.

In some implementations, the computer-implemented method further includes translating coordinates of data points in the plurality of data points from a global coordinate frame to a local coordinate frame. The plurality of data points can correspond to a single one of multiple contiguous segments of data points, each contiguous segment comprising data points for a corresponding contiguous portion of the scene, and the local coordinate frame can correspond to the single one segment. Identifying candidate ground plane data points can include identifying data points having coordinates within a predetermined range of coordinates in the local coordinate frame.

Determining the probability that a data point in the candidate ground plane data points is associated with the ground plane in the scene can include projecting each point in the candidate ground plane data points to the fitted ground plane, calculating a distance between each projected point and other adjacent projected points, and determining that the probability of an individual data point being associated with the ground plane is low when a corresponding calculated distance is less than a threshold distance. Identifying the second subset of data points can include identifying each data point in the first subset of data points that is as close or closer than a threshold distance to at least one other data point in the first subset of data points. Receiving the plurality of data points can include receiving the plurality of data points from one of multiple contiguous segments of data points, each contiguous segment comprising data points for a corresponding contiguous portion of the scene.

In some implementations, the computer-implemented method can further include identifying additional data points in a segment that is contiguous to the one of multiple contiguous segments, wherein the additional data points are determined to also be associated with the object in the scene; the additional data points can be included in the second subset of data points. In some implementations, the computer-implemented method can further include translating coordinates of data points in contiguous segments from respective local coordinate frames to a single global coordinate frame.

Identifying a plurality of features can include calculating a plurality of spin-images for corresponding data points in the second subset. Calculating a plurality of spin-images can include randomly or pseudo-randomly selecting a predetermined number of data points in the second subset of data points and calculating a spin-image for each randomly or pseudo-randomly selected data point.

In some implementations, the predetermined number is in the range of about 500 to 1000. In some implementations, the predetermined number is in the range of about 10% to 50% of a number of data points in the second subset. In some implementations, the predetermined number is about 1000 if there are more than about 1000 data points in the second subset, and if there are less than about 1000 data points in the second subset then spin-images are calculated for each data point in the second subset.

Determining a signature can include employing k-means clustering to calculate a predetermined number of centroids and corresponding cluster weights corresponding to the plurality of spin images. In some implementations, the predetermined number of centroids is between about 10 and 50. In some implementations, the predetermined number of centroids is about 40. In some implementations, the predetermined number of centroids is more than 1000. In some implementations, the computer-implemented method can further include normalizing the cluster weights.

In some implementations, classifying the second set of data points can include calculating a chi-square distance between the calculated signature and the reference signature, and the computer-implemented method can further include determining that the calculated signature and the reference signature correspond when the calculated chi-square distance is less than a threshold distance. In some implementations, classifying the second set of data points can include calculating an earth mover's distance (EMD) between the calculated signature and the reference signature. The computer-implemented method can further include determining that the calculated signature and the reference signature correspond when the calculated EMD is less than a threshold distance.

In some implementations, the computer-implemented method can further include calculating a kernel matrix, wherein entries in the kernel matrix correspond to an EMD between the calculated signature and each of a plurality of reference signatures. In some implementations, the computer-implemented method can further include employing the kernel matrix in a support vector machine to classify the second set of data points.

The computer-implemented method can further include providing training data to train the support vector machine. The computer-implemented method can further include calculating a confusion matrix for a plurality of different classifications corresponding to the support vector machine, and providing additional training data, based on values in the confusion matrix, to enable the support vector machine to more accurately classify sets of data points.

The details of one or more implementations are set forth in the accompanying drawings and the description below. Other features, objects, and advantages the invention will be apparent from the description and drawings, and from the claims.

DESCRIPTION OF DRAWINGS

FIGS. 8A-8C illustrate the example segments shown in FIGS. 3A-C after ground plane points have been removed.

Like reference symbols in the various drawings indicate like elements.

DETAILED DESCRIPTION

This document describes various methods of extracting and classifying individual objects from digitized scenes. In some implementations, the methods are applied to three-dimensional "point cloud" data that has been previously obtained. Various methods exist for obtaining three-dimensional point cloud data. For example, in some implementations, a scene (e.g., an urban scene) can be digitized using overlapping aerial photographs taken from one or more angles with respect to the scene. In particular, for example, a first set of photographs may be taken from directly overhead, and a second set of photographs may be taken from a 45-degree angle with respect to the scene; the two sets of photographs may be processed using a technique such as automatic aerial triangulation. The photographs can include high resolution color images, or the photographs can include laser-scanning data. In some implementations, an urban scene can be digitized using a vehicle-based laser scanner. In some implementations, different digitizing methods can be combined. For example, street-based laser scanned data can be combined with digitized aerial photographs to provide more complete data than may otherwise be available from either method alone.

Figure 1A:
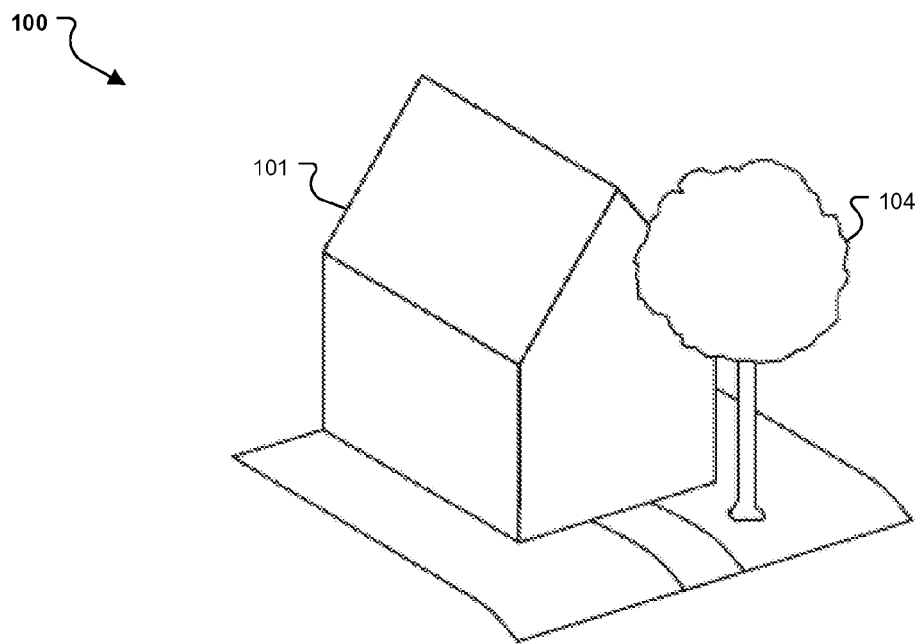
FIG. 1A illustrates an example urban scene.
Figure 1B:
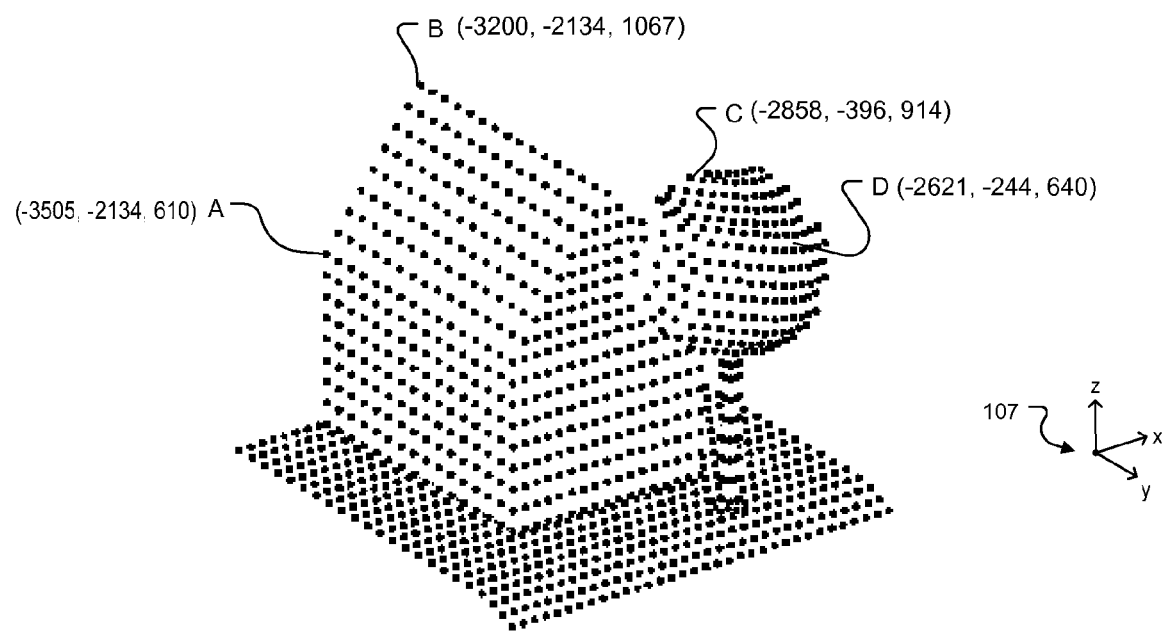
FIG. 1B illustrates an example digital point cloud representation of the scene shown in FIG. 1A.

However acquired, the digitized data is, in some implementations, a three-dimensional point cloud, where each point corresponds to a sample taken from an actual scene and has three-dimensional coordinates (e.g., Cartesian coordinates, polar coordinates, spherical coordinates, etc.). To illustrate, FIG. 1A shows a simple urban scene 100 that includes a house 101 and a tree 104. FIG. 1B shows a digital point cloud representation of the scene 100 shown in FIG. 1A. As shown in one implementation in FIG. 1B, each point corresponds to Cartesian coordinates relative to an origin. In particular, point A is shown as having coordinates (−3505, −2134, 610) relative to an origin 107 (e.g., centimeters from the origin 107 in X, Y and Z directions); point B is shown as having coordinates (−3200, −2134, 1067) relative to the origin 107; and so on. In some implementations, each point is defined in a global coordinate system that may be arbitrarily defined based on how the data points are gathered. In other implementations, different coordinate systems may be used, and the origin of the specific coordinate system employed may be differently positioned.

Figure 2:
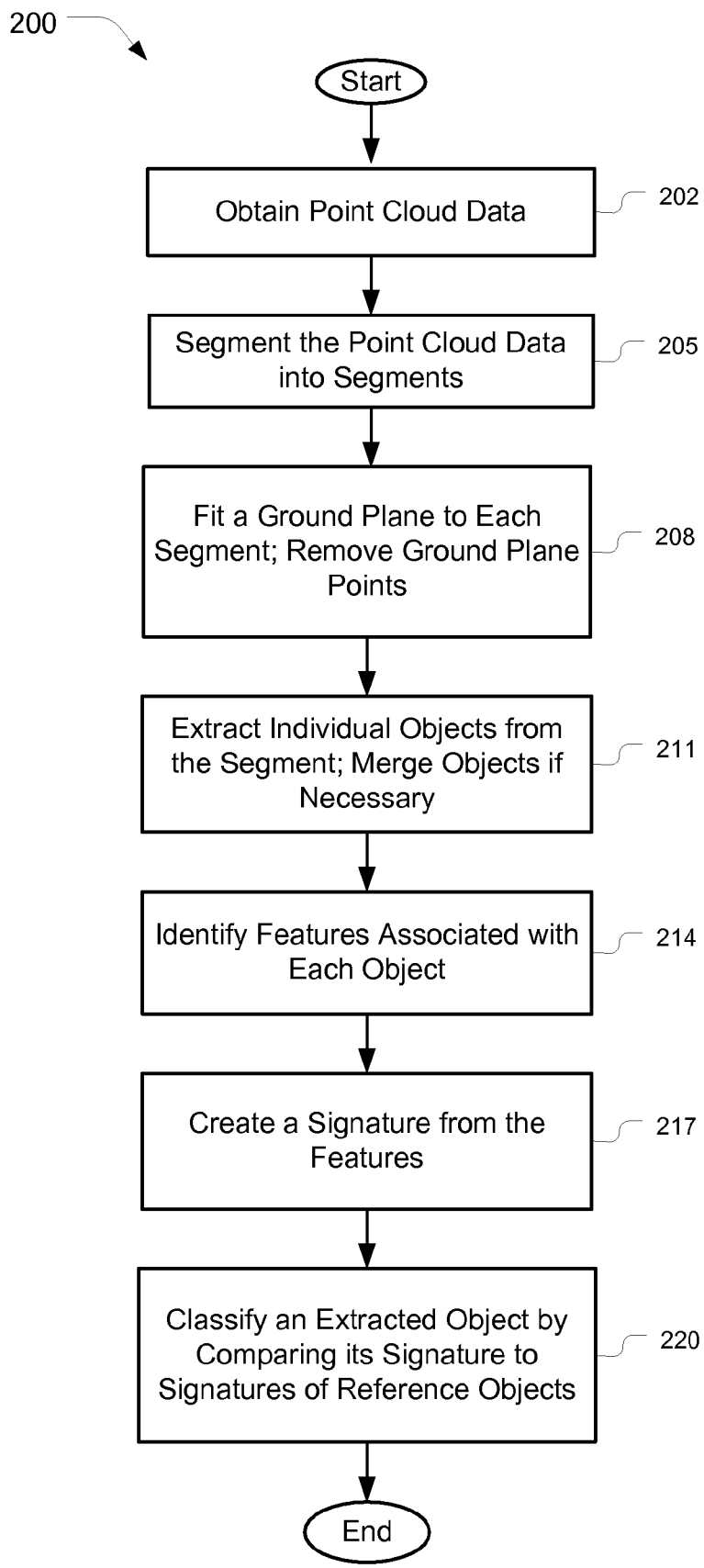
FIG. 2 is a flow diagram of an example method of classifying objects.

In one implementation, a method 200 of classifying objects can include various actions which are depicted in the flow diagram shown in FIG. 2. Each action is described in greater detail in the following sections. By way of introduction, the method 200 can include obtaining (202) point cloud data; segmenting (205) the point cloud data into segments; fitting (208) a ground plane to each segment and removing points in the segment that correspond to the ground plane; extracting (211) individual objects from the segment, and merging the extracted objects with objects in adjacent segments, if necessary; identifying (214) a number of features associated with each object; creating (217) a signature from the features associated with an object; and classifying (220) an extracted object by comparing the object's signature to signatures of reference objects (e.g., in a library of objects). Each action depicted in FIG. 2 is now described in greater detail.

1. Segmenting Point Cloud Data

Figure 3:
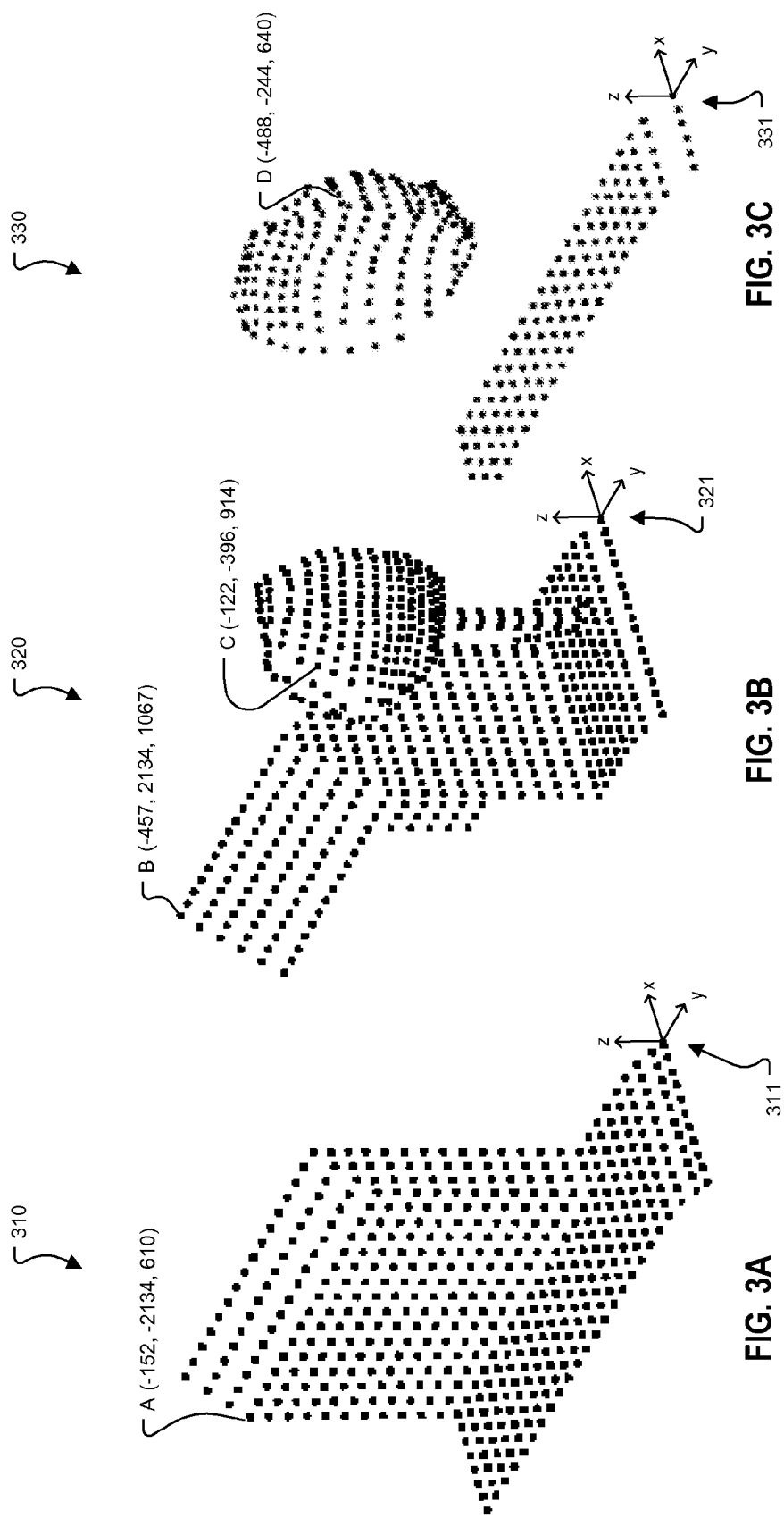
FIGS. 3A-C illustrate example segments taken from the point cloud data that is shown in FIG. 1B.

In some implementations, data associated with a scene is processed in segments. Processing data in segments can, in some implementations, facilitate simultaneous processing of a large number of segments on multiple computing systems, reduce the processing load on any given computing system, and decrease overall processing time. Moreover, a local ground plane is likely to be flat in segments, simplifying processing related to identifying the ground plane, which is discussed in greater detail below. Point cloud data can be segmented in various ways. For example, in some implementations, each segment corresponds to a fixed volume of space or a fixed distance along one dimension. FIGS. 3A to 3C illustrate example data segments 310, 320 and 330. In other implementations, each segment includes a predetermined number of data points (or range in number of data points). In other implementations, data can be segmented based on terrain. In particular, for example, regions that are relatively flat may have larger segments, whereas regions whose terrain changes more than some threshold amount may have smaller segments.

2. Fitting a Ground Plane to Each Data Segment

Data points that correspond to the ground in each segment can be removed to, for example, facilitate extraction of individual objects in the segment. In some implementations, identifying data points that correspond to a ground surface in the scene is an iterative process that is depicted in FIG. 4 and described in greater detail with reference to FIGS. 5 through 7.

Figure 4:
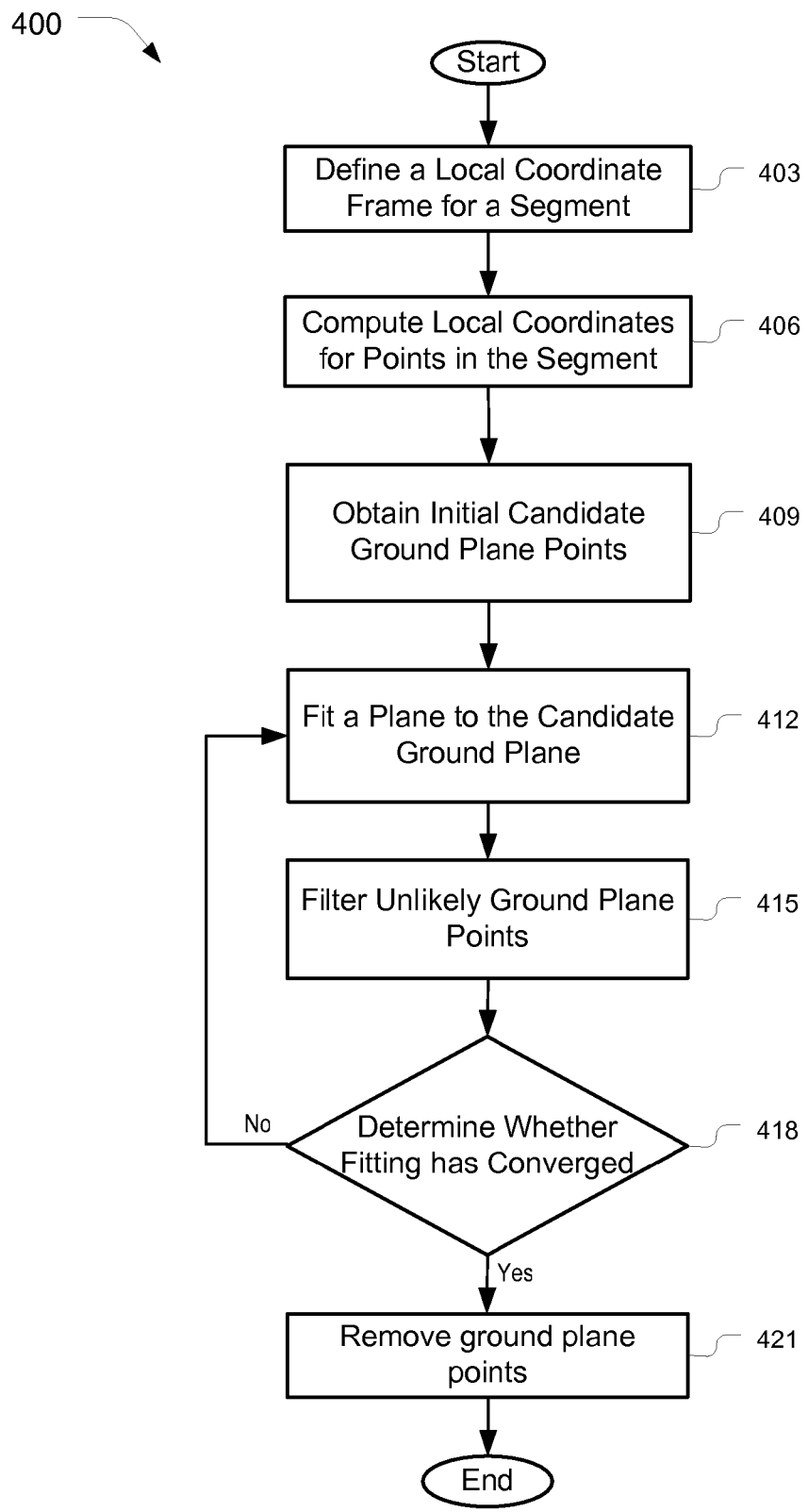
FIG. 4 is a flow diagram of an example process for fitting a ground plane to a segment of data points.

As shown in FIG. 4, and example process 400 for fitting a ground plane to a segment of data points can include defining (403) a local coordinate frame for the segment; computing (406) local coordinates of each point in the segment; obtaining (409) initial candidate ground plane points; fitting (412) a plane to the candidate ground plane points; filtering (415) points that are less likely to be ground plane points, based on the fitting (412); determining (418) whether the fitting process has converged (e.g., based on a number of data points that are filtered out); and if the fitting process has converged, removing (421) the ground plane points; and if the fitting process has not converged, repeating the fitting (412) and filtering (415) until the fitting (412) process has converged. Each of the actions in the example process 400 are now described in greater detail with reference to the figures.

2.1 Defining a Local Coordinate Frame, Mapping Points to the Local Coordinate Frame In some implementations, a local coordinate frame is defined for each segment, and the coordinates of the data points in each segment are translated from a global coordinate frame to the local coordinate frame corresponding to the segment. FIGS. 3A to 3C illustrate examples segments 310, 320 and 330, taken from the overall point cloud data that is shown in FIG. 1B. As depicted, each segment 310, 320 and 330 has a corresponding local coordinate frame 311, 321, and 331, defined for purposes of example with reference to a front corner of the segment. Other local coordinate frames are possible, and the local coordinate and global coordinate systems can be different. For example, in some implementations, the global coordinate system is a spherical coordinate system, and the local coordinate system is a Cartesian coordinate system.

Once a local coordinate frame is defined for a given segment, data points within the segment can be translated using known mathematical transformations. Point A in FIG. 3A, points B and C in FIG. 3B and point D in FIG. 3C are shown with translated coordinates corresponding to the respective local coordinate frames, which are defined with respect to the origins 311, 321 and 331, respectively, for purposes of example.

2.2 Obtaining Initial Candidate Ground Plane Points

Figure 5C:
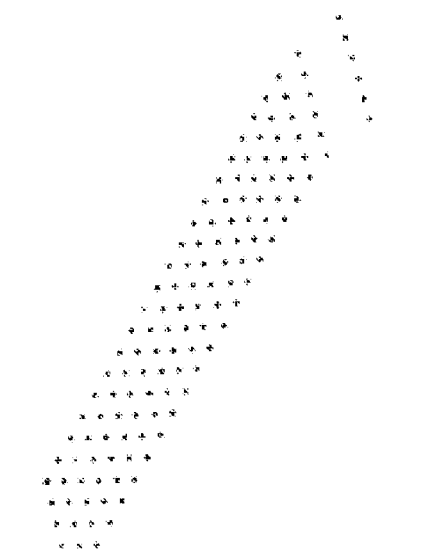
FIGS. 5A-C illustrate example candidate ground plane points that can be selected from the segments shown in FIGS. 3A-C.
Figure 5B:
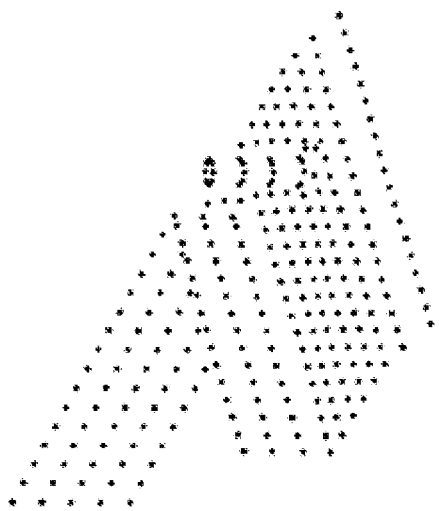
Figure 5A:
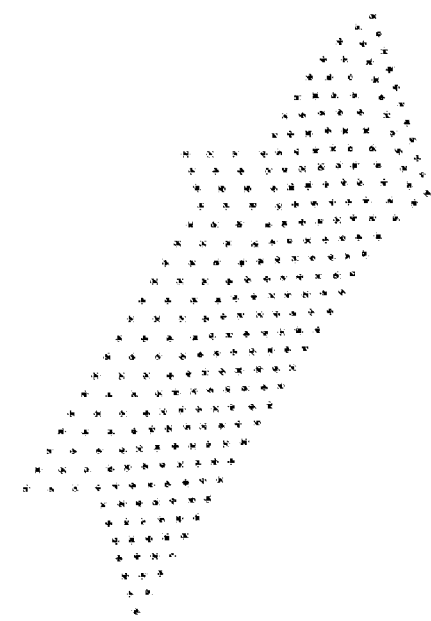

Once data points in a segment are mapped to a local coordinate frame, initial candidate ground plane points can be identified. For example, where the local coordinate frame is a Cartesian coordinate frame, as depicted in FIGS. 3A-C, the initial candidate ground plane points can be those points that are some threshold distance in the Z direction above the X Y-plane. FIG. 5A illustrates example candidate ground plane points that can be selected from the segment shown in FIG. 3A; FIGS. 5B and 5C illustrate example candidate ground plane points that can be selected shown in FIGS. 3B and 3C, respectively.

2.3 Fitting a Plane to Candidate Ground Plane Points

A plane can be fit to candidate ground plane points in various ways. For example, some implementations employ a least-squares fitting method, such as Z-function fitting, the Eigenvalue method, the maximum likelihood estimation method or the renormalization method. Other methods can be used to fit a plane to the candidate ground plane points. In some implementations, a non-planar surface can be fit to the candidate ground plane points, for example, to accommodate non-planar ground surfaces (e.g., quadratic surfaces).

2.4 Filtering Points to Eliminate Unlikely Ground Plane Points

Based on an initial fitting process, certain candidate ground plane points can be identified as points that are unlikely to be associated with a ground plane, and these points can be filtered out—for example, to facilitate a more precise fit of a ground plane or surface through iterative processing. One example method of filtering is described with continued reference to the figures.

In some implementations, candidate ground plane points can be projected onto the ground plane to identify points that are unlikely to correspond to a true ground plane represented by the data. In particular, the points can be translated in a direction that is normal to the fit plane (e.g., substantially along the Z axis in FIGS. 5A-5C). Once points are projected, dense groupings of points can be eliminated as candidate ground plane points, since such densely grouped points may be more likely to correspond to vertical structures above the true ground plane than to the ground plane itself. Results of example projections of points to the ground plane in each of the segments 310, 320 and 330 is depicted in FIGS. 6A-6C.

Figure 6A:
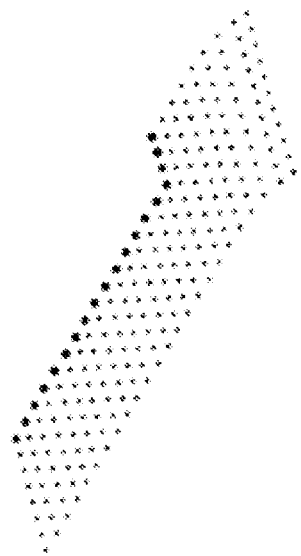
FIGS. 6A-C depict example projections of the candidate ground plane points shown in FIGS. 5A-C to candidate ground planes.
Figure 6B:
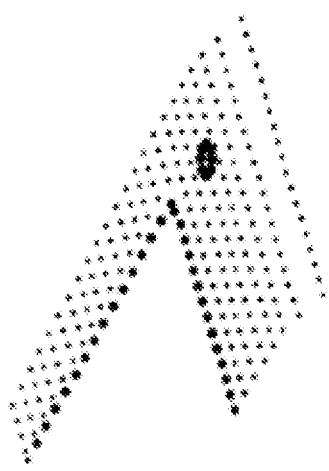
Figure 6C:
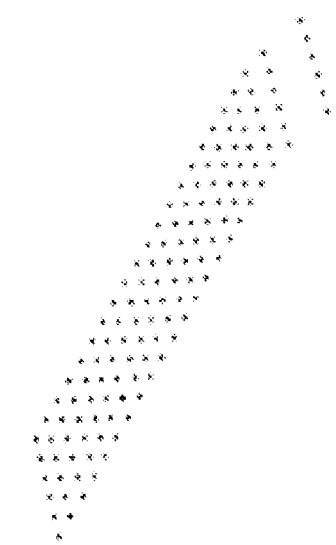

As is depicted in FIG. 6A, projected points are densely grouped along two lines that correspond to the side and front of the house 101. Similarly, as depicted in FIG. 6B, projected points are densely grouped along two lines that correspond to the front and opposite side of the house 101 and along the circumference of the trunk of the tree 104. In FIG. 6C, no points are densely grouped since no points are near the true ground plane in the corresponding segment 330, other than the true ground plane points themselves.

In some implementations, a point is eliminated if it is closer than some threshold distance to other points (e.g., closer than about 50%, 25% or 10% of an average distance between points, or closer than a user-defined percentage of an average distance between points). The process of eliminating points as candidate ground plane points can be performed recursively, or only a subset of points identified as densely grouped may be removed in one step.

After an initial set of candidate ground plane points has been filtered, a new ground plane can be fit to the remaining points. After the new ground plane has been fit to the filtered candidate ground plane points, remaining points can again be projected to the new ground plane, and densely grouped points can again be filtered out. This process can be performed iteratively until the filtering process converges.

In some implementations, convergence is determined by fewer points being filtered out after an iteration than some threshold number of points (e.g., 5% of the remaining points). In other implementations, convergence is determined by the ground plane moving less than some threshold amount between iterations. In other implementations, convergence, per se, is not analyzed; rather the iterative process of filter, projecting, filtering and refitting is performed a predetermined number of times (e.g., five times).

Figure 7A:
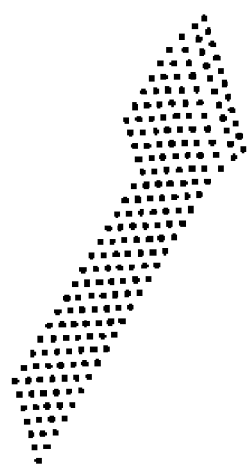
FIGS. 7A-7C depict example sets of ground plane points.
Figure 7B:
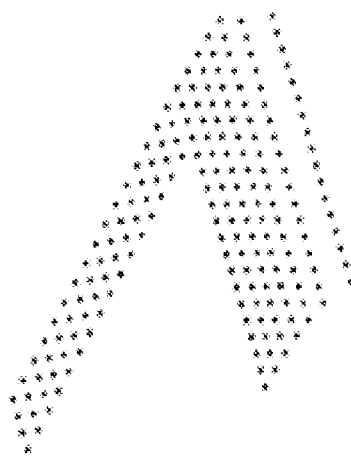
Figure 7C:
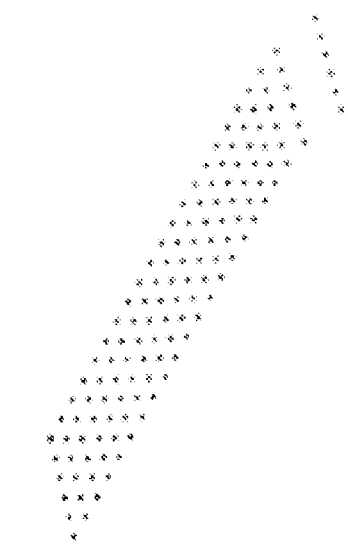

FIGS. 7A-7C depict example sets of ground plane points that have been identified, for example, through the above-described example process. Once identified, the ground plane points can be removed from each segment. FIGS. 8A-8C depict the segments 310, 320 and 330 of data points shown in FIGS. 3A-3C, after ground plane points have been removed. In some implementations, removal of the ground plane points facilitates more efficient object extraction, which is now described.

3. Object Extraction and Merging

With ground plane points removed from each segment of data, individual objects within the segment can be extracted. In some implementations, points that are within some threshold distance of other points are associated with each and with an individual discrete object. For example, FIG. 8B depicts two groups of points—a first group of points corresponding to a portion of the house 101, where each point in the first group is relatively close to at least one other point in the first group; and a second group of points corresponding to a portion to the tree 104, where each point in the second group is relatively close to at least one other point in the second group. In this example, each point in the second group may be more than the threshold distance from any point in the first group.

As depicted by FIGS. 8A-8C, removing the ground plane points can highlight the distance between sets of points that correspond to different discrete objects in the scene, thereby making object extraction a simpler, more efficient process. In some implementations, the threshold distance can be related to a characteristic of the original point cloud. For example, if the data points in the point cloud are separated by an average distance of 20 cm, the threshold distance for associating data points with a single object can be some multiple of the average distance (e.g., one, two or three-times the average distance).

In some implementations, points corresponding to individual objects are included in two or more segments. For example, points corresponding to the house 101 appear in both segments 310 and 320, shown in FIGS. 8A and 8B, respectively; and points corresponding to the tree 104 appear in both segments 320 and 330, shown in FIGS. 8B and 8C, respectively. To capture all points that correspond to a single object, multiple sets of points from different segments can be merged into a single set.

To associate points in multiple segments with a single object represented by a single set of points, points in each segment are, in some implementations, remapped to a global coordinate system. Distance can then be compared between a point near the edge of one segment to a point near a corresponding edge of an adjacent segment using the global coordinate system to determine whether the points are within some threshold distance of each other. Points E and F are shown in FIGS. 8A and 8B to further illustrate. As shown, in one example, point E has local coordinates 805 of (−3, −610, 838) and point F has local coordinates 808 of (−604, −610, 838). When the points are translated to an example global coordinate system, point E has global coordinates 806 of (−3356, −610, 838) and point F has global coordinates 809 of (−3347, −610, 841). From these global coordinates, distance between the points can be calculated (e.g., using a distance-determining formula such as $\sqrt{(x_1-x_2)^2+(y_1-y_2)^2+(z_1-z_2)^2}$). In an example coordinate system in which each unit is one centimeter, calculation of distance in the global coordinate system reveals that points E and F are relatively close (e.g., about 9.5 cm apart in this example). Accordingly, the system can associate these points with the same object.

Figure 9B:
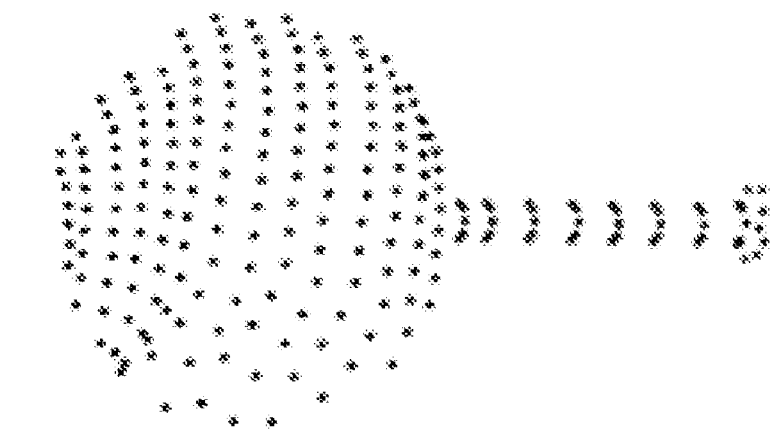
FIGS. 9A and 9B depict merging objects that span multiple segments.
Figure 9A:
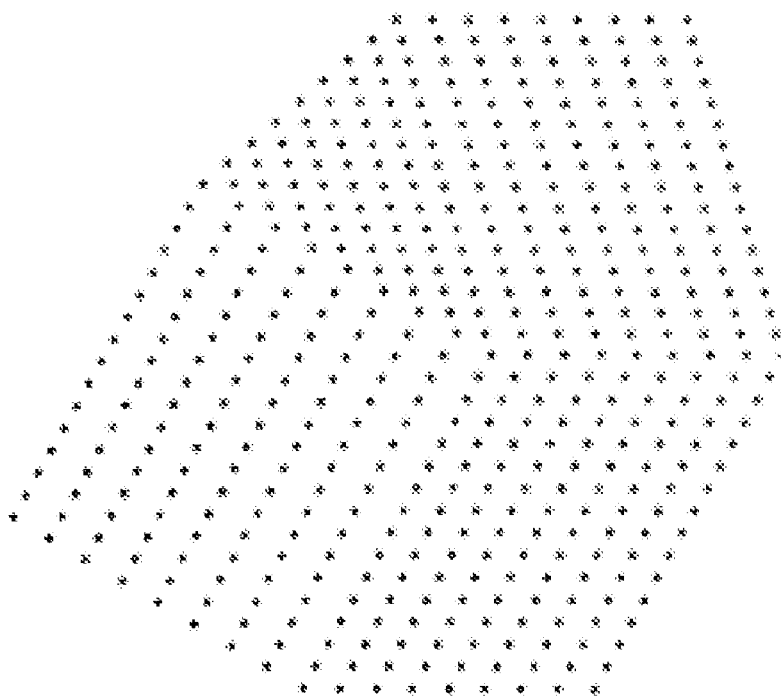

FIGS. 9A and 9B depict results of merging objects that span multiple segments. In particular, FIG. 9A depicts data points that correspond to the house 101, which were included in segments 310 and 320; FIG. 9B depicts data points that correspond to the tree 104, which where included in segments 320 and 330. In some implementations, once objects are extracted and merged, corresponding data points may again be translated to a new coordinate system. For example, the data points can be translated to a coordinate system whose origin is defined to be within the data points (e.g., a corner or center of the house 101 or tree 104). In some implementations, the specific coordinate system to which the points are translated can be dependent on the corresponding distribution of data points. In particular, for example, some implementations employ a Cartesian coordinate system for data points corresponding to the house 101 and a cylindrical coordinate system for data points corresponding to the tree 104 (or other sets of data points that have an approximate axis about which the data points have some amount of symmetry).

In some implementations, objects are not merged, even though it may be determined that the objects span multiple data segments. For example, data points corresponding to row houses or to a long building may appear in multiple data segments, but each segment may be processed independently of contiguous segments, even if objects span the multiple contiguous segments. In other implementations, objects can be merged if they appear in fewer than a predetermined number of data segments. For example, data points associated with a single object may be merged if the data points appear in three or fewer data segments, but the data points may not be merged if they appear in four or more data segments. The above description of merging objects is merely exemplary, and data points can be extracted and merged in various ways without departing from the scope of the above description.

4. Classifying Objects

In some implementations, once an object is extracted from an initial point cloud, the points corresponding to the object are further processed to classify the object as a particular type (e.g., a building, an automobile, a tree, a shrub, etc.). With reference to FIG. 2, further processing, in some implementations, includes identifying (214) features of the object; creating (217) an object signature from the features; and classifying (220) the object by comparing the object's signature to signatures of reference objects (e.g., in a library of reference objects). Each part of this example is now described in greater detail.

4.1 Identifying Object Features

In some implementations, points corresponding to an object are processed in some way to identify features that can facilitate efficient recognition and classification of the object. In general, processing the points can include using the points to create a different representation of the object. For example, points within an object could be fit to a number of elementary shapes (e.g., cylinders, spheres, cubes, etc.), and the elementary shapes could be used to store information about the objects. In particular, in a very basic system, the tree could be represented by cylinder and a sphere. In other implementations, a more complicated representation of the data points is employed to store more detail associated with the object. One such way of representing an object is by representing the object as a collection of spin-images. Spin-images are described in detail in Johnson, Andrew, 1997, Spin-Images: A representation for 3-D surface matching, Ph.D. Dissertation, Carnegie Mellon University. A brief overview of spin-images is now provided.

Figure 10:
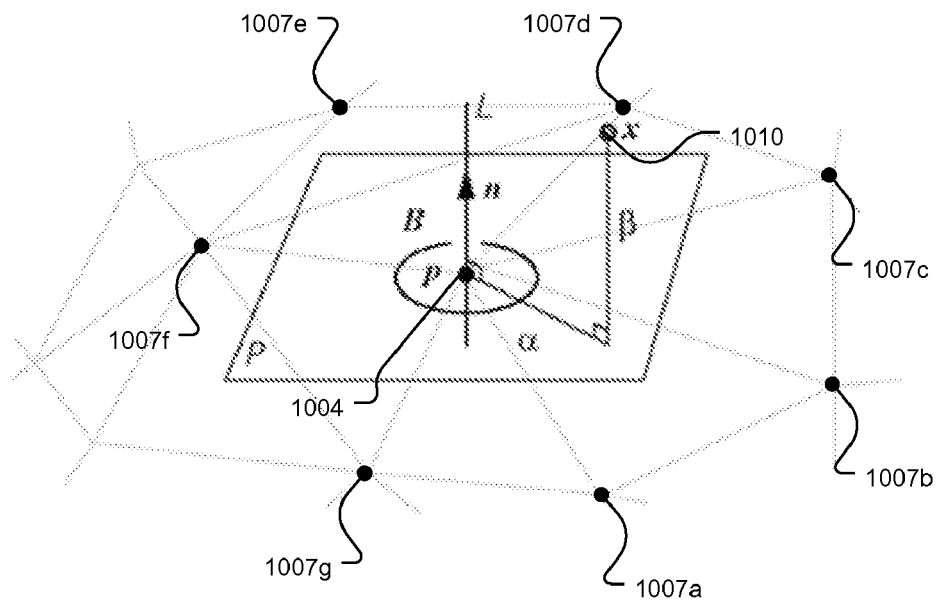
FIG. 10 illustrates a portion of an example mesh representation of an object.
Figure 11:
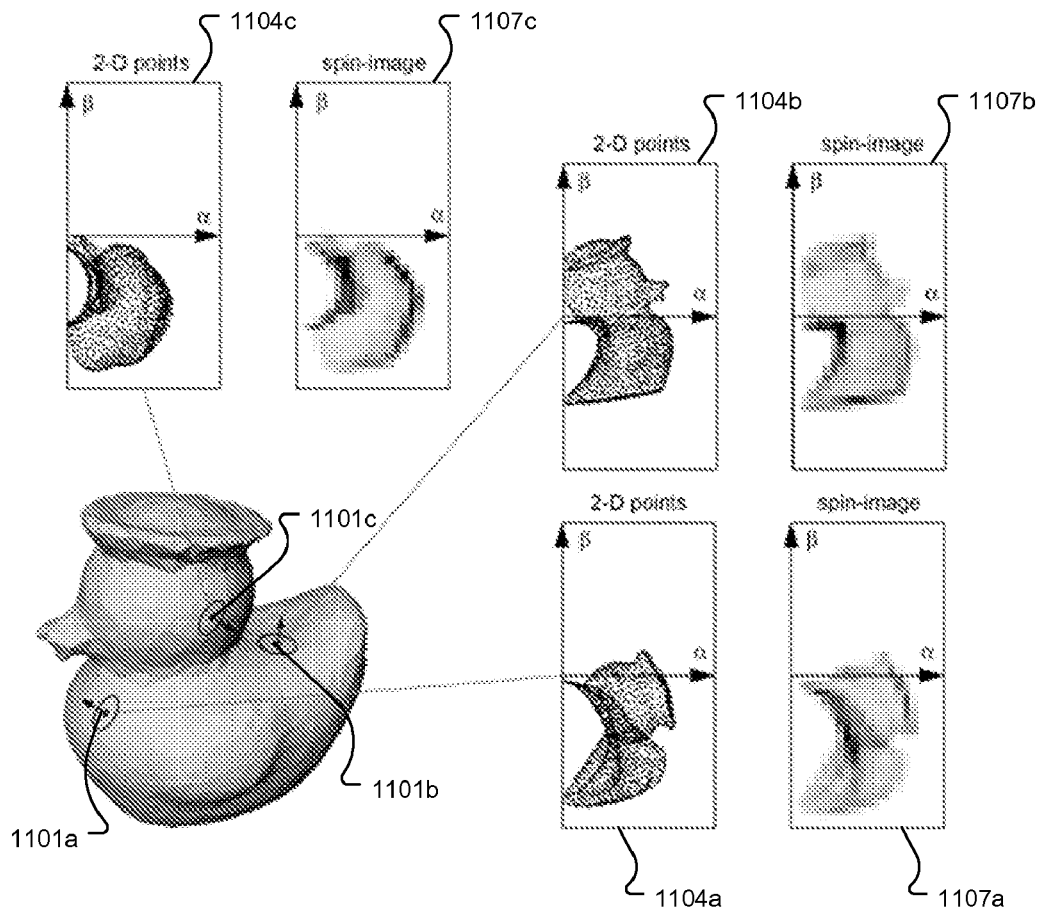
FIG. 11 depicts a mesh representation of an example object and corresponding 2-D collections of points and spin-images associated with three points on the example object.

A collection of spin images can be created from a mesh representation of an object. In some implementations, a mesh representation of an object is a collection of points that represent the object, where adjacent points from the surface of the object are connected with lines to form a mesh that represents the surface of the object. FIG. 11 depicts a mesh representation of a rubber duckie toy; FIG. 10 illustrates a portion of the mesh representation. Individual spin images can be created for any given point on the mesh.

In some implementations, the process of creating a spin image includes selecting a single point that serves as a basis for the spin image. In FIG. 10, point p 1004 is an example basis point. A direction can be determined for the basis point 1004, which can be a direction L that is normal to the surface of the object near the point. One method of determining the direction L is to fit a plane P to the points on the mesh that are immediately adjacent to the basis point 1004 (e.g., the points 1007a-g) and determine the surface normal n to the fitted plane P (e.g., the surface normal n that points "outside" the represented object).

Once a basis point is selected for a particular spin image, other points in the object can be described with reference to the basis point. In particular, any other point (e.g., point x 1010) can be described relative to the basis point 1004 with coordinates ($\alpha$, $\beta$), where $\alpha$ is the perpendicular distance from a line that is parallel to the direction of the basis point 1004 (e.g., the surface normal) and runs through the basis point p 1004, and $\beta$ is the distance from the point 1010 to the plane P. In some implementations, coordinates for all points in the object can be determined relative to the basis point, and these points can be mapped in an ($\alpha$, $\beta$) coordinate system. FIG. 11 illustrates three collections of such 2-D points—collection 1104a, collection 1104b and collection 1104c. Each collection of points described relative to a different basis point—in particular, basis points 1101a, 1101b and 1101c, respectively.

From the collections 1104a-c of 2-D points illustrated in FIG. 11, a spin-image can be created. In some implementations, the spin-image represents a graphical representation of density of points in the corresponding collection of points 1104a, 1104b and 1104c. For example, as shown in the 2-D collection of points 1104a and the corresponding spin-image 1107a, areas of high point density in the 2-D point collection 1104a are represented by darker image tiles in the spin-image 1107a; areas of lower point density in the 2-D point collection 1104a are represented by lighter image tiles in the spin-image 1107a. In this manner, detailed point data from the 2-D point collections 1104a-c can be represented by images.

In some implementations, the number of pixels in the images can be less than the number of points in the corresponding collection of 2-D points. Thus, conversion to the spin-image can have the effect of averaging information associated with specific points in an object and can also facilitate efficient storage of information about an object. Multiple spin images can be created for a given object. For example, for purposes of illustration, FIG. 11 shows three spin-images 1107a-c that correspond to three different basis points 1101a-c.

Representations of an object that include a collection of spin-images can be used for object recognition, comparison or classification. In particular, for example, multiple spin-images from one object can be compared to multiple images of a library object for purposes of classification. If enough individual spin-images match between the object and a particular library object, the object can be, for example, classified according to the classification of the library object (e.g., a tree, a house, a rubber duckie toy, etc.).

Various parameters associated with a spin-image can be varied to affect the level of detail captured by the spin image, such as, for example, "image width," "bin size" and "support angle." Detailed description of these parameters is provided in (Johnson 1997) but is not necessary for this disclosure; accordingly, such description is omitted. In general, however, variation of the parameters can control the amount of detail of an object that is captured in each spin image. In some implementations, it is advantageous to capture a large amount of detail in each spin image; in other implementations, it is advantageous to capture less detail (e.g., to "average" each spin-image to a greater degree).

Spin-images can, in some implementations, provide several advantages over other representations of an object. In particular, spin-images employ an object-centered coordinate system, so they can describe an object in a manner that is independent of its pose. Depending on various parameters associated with each spin-image in a collection of spin-images (e.g., image width, bin size and support angle), spin-images can also be made robust with respect to occlusion and clutter. That is, spin-images can be effectively employed to characterize objects where portions of the object are missing in the object's point cloud representation (e.g., occluded by other objects) or where other objects are very close to a given object (e.g., in a "cluttered" scene).

Figure 12A:
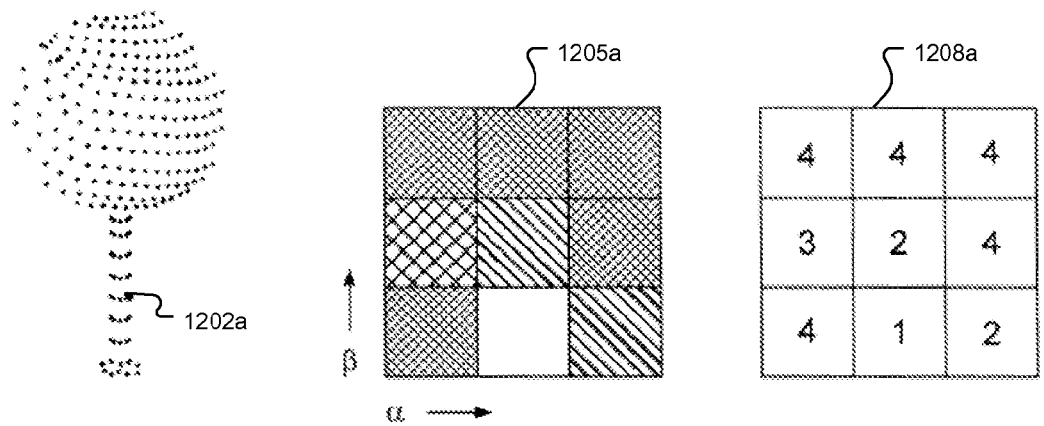
FIGS. 12A-12C illustrate three example basis points and corresponding spin-image representations of the object shown in FIG. 9B.
Figure 12B:
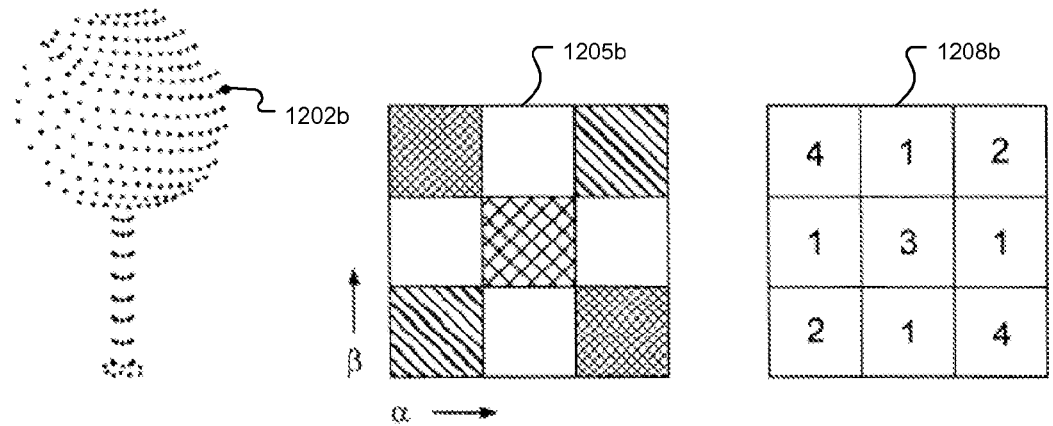
Figure 12C:
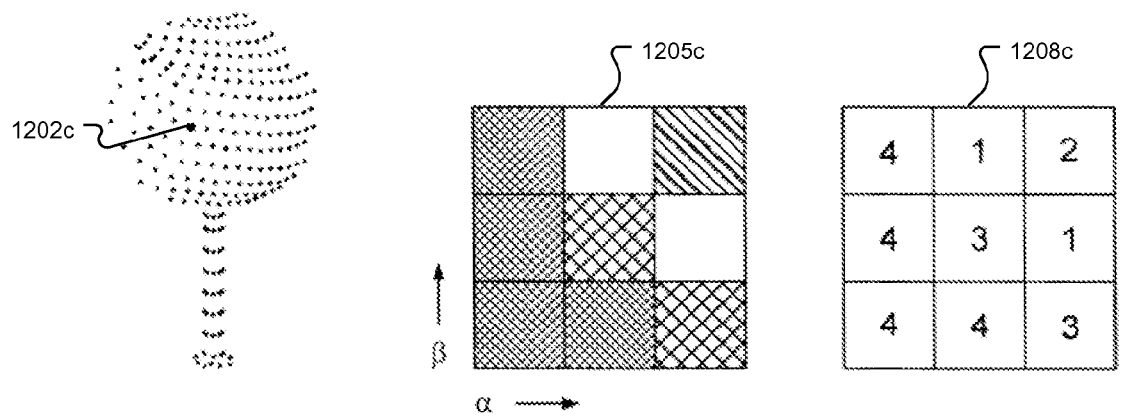

FIGS. 12A-12C illustrate three example basis points and corresponding example spin-image representations for the tree 104. In particular, FIG. 12A illustrates a basis point 1202a and a corresponding spin-image 1205a. In the example shown, the spin-image 1205a is a three-by-three matrix, where each cell in the matrix (e.g., each image tile) has one of four shading values that represents the density of points in a corresponding 2-D point collection in an ($\alpha$, $\beta$) coordinate system relative to the basis point 1202a. Matrix 1208a illustrates a numerical alternative representation of the spin-image 1205a, where a number is used in place of shading to represent point densities. FIGS. 12B and 12C illustrate other basis points 1202a and 1202b and corresponding spin-images 1205b and 1205c and matrix representations 1208b and 1208c of the spin-images.

FIGS. 12A-C are merely exemplary. Numerous variations are possible. For example, spin-image parameters could be varied to provide a spin-image with more pixels, which could, in turn, be represented by a matrix with more rows and columns. The array of pixels (and corresponding matrix) could be rectangular, rather than square. More values could be used to represent a greater granularity in point density (e.g., sixteen levels of gray, or values in the matrix, rather than four). Various other parameters used to generate the spin-image could be modified.

A collection of spin-images can be created for any object, and this collection of spin-images can be used for various purposes, such as classifying the object or graphically recreating the object in a computing system. In some implementations, individual spin-images from an object can be further processed, for example, to classify the object. In particular, for example, a signature of an object can be created from the various spin-images—a process which is now described—and that signature can be subsequently used to compare the object to other objects in a library.

4.2 Creating a Signature for the Object from the Object Features

In some implementations, a signature for an object is created from a sampling of object features. For example, in implementations in which discrete object features are spin-images of the object, a signature can be created from multiple sample spin-images. In particular, multiple spin-images can be formed from an object, and a sample subset of the multiple spin-images can be used to create a signature. Alternatively, a sample of points associated with an object can be first identified, spin-images associated with the sample points can be formed, and a signature can be created from the formed spin-images.

In general, a signature can serve as a sort of "fingerprint" of an object that can facilitate efficient identification of the object or comparison of the object to other objects. Signatures can be numerical representations of an object that are calculated based on various mathematical transformations of underlying features of the object. In particular, some implementations employ k-means clustering to calculate a signature for an object.

In the case of discrete data points, k-means clustering can include determining an initial number of cluster centers or centroids, and assigning each discrete data point to the cluster centroid that is closest, then recalculating each centroid by averaging all of the points in the cluster. In three-dimensional Cartesian space, averaging points to calculate a centroid can include averaging the coordinates of each point along each respective axis (i.e., the x-coordinate of the centroid can be an average of the x-coordinates of each data point in the corresponding cluster, the y-coordinate of the centroid can be an average of the y-coordinates of each data point in the corresponding cluster, etc.). After the centroids are recalculated, the data points can be reclustered, and this process can be repeated a number of times until the centroids and the clusters stabilize or converge.

In the case of clustering features, such as spin-images, rather than discrete data points, k-means clustering can include analogous mathematical operations that, for example, have the effect of identifying clusters of particular aspects related to the features (e.g., spin-images). Accordingly, clustering can include more advanced mathematical processing (e.g., complex matrix transformations) than just arithmetic averaging.

Parameters of clusters other than cluster centers can be calculated. For example, each cluster can have a weight that describes how close each member of the cluster is to the cluster centroid. A "tight" cluster whose member elements are disposed close to the cluster centroid may have a greater weight than a cluster whose member elements are more loosely organized around the cluster centroid.

Various parameters of the clusters can constitute the signature of a corresponding object. For example, in some implementations, the cluster centroids (e.g., coordinates of the centroids) and cluster weights can be uses as a signature. In some implementations (e.g., to facilitate comparison of one object to another), the cluster weights can be normalized, such that the weights sum to one (or some other fixed number).

In some implementations, a subset of points corresponding to a discrete cloud of points are randomly or pseudo-randomly selected. For example, 1000 points could be selected, 100 points, 20% of the points within a particular cloud, 10% of the points, or some other number of points. In particular, for example, a subset of 1000 randomly selected points could be selected for an object, and if the object has less than 1000 points, all of the object's points could be included in the subset. Features can be computed for each of the points in the subset. For example, spin-images could be calculated for each of the points. The features can then be clustered into some number of clusters. For example, k-means clustering could be employed to cluster the spin-images into 40 clusters (or some other number of clusters). After a possible iterative calculation of the clusters (e.g., iterative recalculation of the centroids based on recursive cluster operations), the cluster weights can be normalized. The cluster centroids and normalized cluster weights can then be stored as the object's signature.

4.3 Classifying an Object Based on its Signature

Once a signature has been calculated for an object, the calculated signature can be compared to signatures of other objects in order to classify the object. In particular, for example, a signature of an object (e.g., an object comprising a cloud of data points that has been isolated from data points associated with other objects using, for example, the methods described above) can be compared to signatures of objects in a reference library of objects to classify the object. More specifically, a signature for a cloud of points (e.g., from an urban scene) that is likely to represent one of a tree, a shrub, an automobile, a building or a portion of a building, or a pole, could be compared to signatures for a reference tree, a reference shrub, a reference automobile, a reference building or a portion thereof or a reference pole; and based on the comparison, the original object could be appropriately classified.

Subsequent to classification, objects can be further processed. For example, an object can be digitally rendered based on its point cloud representation and its classification. In particular, for example, a cloud of points that is classified as a tree could be rendered in a shape that is consistent with a cloud of data points and in colors that are appropriate for a tree (e.g., a brown or gray textured trunk, and green foliage). Similarly, a cloud of points that is identified as an automobile could be rendered in a shape consistent with a cloud of points and with colors and texture that is appropriate for a vehicle (e.g., black tires, a uniform, possibly random body color, with appropriately placed and colored windshields and windows, handles, tailpipe, etc.). The rendered classified object can be stored in a digital library of objects for various purposes, such as three-dimensional modeling or visualization applications.

Various techniques can be employed to compare the signature of an object to the signature of a reference library object. For example, a chi-square goodness of fit test (e.g., a chi-square measure of distance) could be employed to compare an object's signature with the signature corresponding to a library object. As another example, an earth mover's distance measure could be employed to compare an object's signature with a signature corresponding to a library object. In some implementations in which a chi-square measure of distance is employed, a larger number of features may be used to calculate a signature for an object than would be used in implementations that employ an earth mover's distance. In particular, for example, features (e.g., spin-images) can be clustered into, for example, one or more thousand clusters using k-means clustering. In general, the number of features selected, the number of clusters calculated and the distance measurement that is employed can be selected to optimize both computation time and the ultimate accuracy of the classification (described below), which may depend in part on a number of possible classes within the classification scheme. For purposes of example, an earth mover's distance is now described further.

Earth mover's distance (EMD) can capture mathematically the "work" involved in transforming one distribution to another. In the context of images, for example, very similar images may have a small EMD (e.g., images of the same object from two slightly different poses). That is, very little work may be required to transform the first image of an object to a second image of the same object having a slightly different pose. Conversely, two very dissimilar images (e.g., images of different objects with different backgrounds) could be separated by a greater EMD. That is, much more work may have to be expended to transform the first image to the second image.

In some implementations, EMD is a useful measure of distance for comparing image data because it can effectively capture a perceptual similarity between objects. Moreover, EMD can be effective in calculating distance between signatures having unequal numbers of clusters. In addition, calculations of EMD can be based on solutions to the so-called transportation problem, for which efficient algorithms are available. A more detailed description of EMD is available at Rubner, Y., Tomasi, C., and Guibas, L. J. 1998 *The Earth Mover's Distance as a Metric for Image Retrieval. Technical Report.* UMI Order Number CS-TN-98-86., Stanford University.

To classify an object, the object's signature can be compared to signatures associated with various other objects in a library of reference objects. Such a library of reference objects can be created during a training phase of a classification algorithm, which may employ various classification schemes. In some implementations, a support vector machine (SVM) learning method can be used to classify objects.

In some implementations, to facilitate use of an SVM method for classifying objects, a kernel matrix can be formed from distances (e.g., in the form of EMD) between the object's signature and signatures of reference objects in the library. In particular, in some implementations, each element in the kernel matrix can have a value given by $$K(S_i, S_j) = \exp\left(-\frac{1}{A}D(S_i, S_j)\right),$$

where $D(S_i, S_j)$ is an EMD between signatures $S_i$ and $S_j$, and A is a mean value of the EMD between all training samples.

The kernel matrix can then be used, in some implementations, to classify objects using SVM techniques. SVM techniques are not described in detail here, but in general, can include analyzing training data to identify functions that separate the data into discrete classes, then using the functions to analyze and classify new data. For example, in a two dimensional scenario of classifying data points, an SVM algorithm could include identifying a line that best divides training data points into, for example, two classes. New data points can then be compared to the line to determine the side of the line on which the new data points fall and thus which classes the new data points are likely to belong to. One example of an SVM for two classes is given by $$g(x) = \sum_i \alpha_i y_i K(x_i, x) - b,$$

where $K(x_i, x)$ is a kernel function for training sample $x_i$ and test sample x, $y_i$ is the binary class label of $x_i$ (+1 or −1), $a_i$ is the learned weight and b is a learned threshold parameter.

For more complicated data (e.g., three-dimensional data, n-dimensional data, cluster data, etc.), an SVM algorithm can include more involved mathematics than merely identifying a line that separates two-dimensional data points (e.g., the method could include mapping data into another dimension or space, identifying one or more hyperplanes that separate the mapped data into different classes, receiving new data to be classified, mapping the new data to the appropriate dimension or space, and using the hyperplanes in that space or dimension to classify the data). The exact details of the SVM algorithm are not critical to this document, and the reader is referred to references such as the following: Nguyen, C. H., Ho, T. B., *Kernel Matrix Evaluation*, Twentieth International Joint Conference on Artificial Intelligence IJCAI'07, Hyderabad, 987-992 (2007), and C. J. C. Burges. *A tutorial on support vector machines for pattern recognition.* Data Mining and Knowledge Discovery, 2(2):955-974, 1998.

In some implementations, a confusion matrix can be formed (e.g., during a training phase, in order to identify specific areas of weakness in a classification algorithm). Such a confusion matrix could, in some implementations, be used to optimize some aspects of the recognition or classification process (e.g., a number of spin-images to be calculated, a number of clusters employed in generating a signature, a number of iterations employed to allow cluster centroids to settle or converge, a number of training samples to use in an SVM algorithm, etc.).

Figure 13:
FIG. 13 illustrates an example confusion matrix that may be employed to enhance a recognition or classification process.

FIG. 13 illustrates an example confusion matrix 1301 for seven different classes of objects. In the confusion matrix 1301, each column can represent a predicted object class, and each row can represent an actual class of an object. The intersection of each row and column can indicate a percentage correspondence between actual class and predicted class. In particular, for example, as shown in FIG. 13, an actual vehicle side is predicted to be the side of a vehicle 92.71% of the time for some number of training samples and a building fragment 3.75% of the time (e.g., see cells 1305 and 1308). As another example, an actual tree is predicted to a tree 75.77% of the time and a shrub 21.73% of the time (e.g., see cells 1311 and 1314). Such a confusion matrix 1301 can be employed to enhance a SVM or other supervised learning algorithm.

In some implementations, a confusion matrix 1301 can be employed to identify certain classifications for which additional processing may be required. In particular, for example, if trees and shrubs are confused by a seven-object classification algorithm (e.g., confused more than some threshold percentage of the time) such as that depicted by the confusion matrix in FIG. 13, objects that are initially classified as either a tree or a shrub could be re-classified by a different algorithm (e.g., an algorithm that only classifies trees and shrubs). In other implementations, the confusion matrix 1301 could be employed in a different manner to enhance a recognition or classification process.

A number of implementations have been described. Nevertheless, it will be understood that various modifications may be made without departing from the spirit and scope of the disclosed implementations. Accordingly, other implementations are within the scope of the following claims.

What is claimed is:

1. A computer-implemented method of classifying image data, the method comprising:
   receiving, at a computing system, a plurality of data points corresponding to three-dimensional image data, and using the computing system for:
   mapping the plurality of data points to a local coordinate frame, the local coordinate frame defining a plane;
   identifying a ground plane in a scene represented by the plurality of data points by:
      determining candidate ground plane data points from the plurality of data points;
      fitting a plane to the candidate ground plane data points;
      defining a sub-set of the candidate ground plane data points, each candidate ground plane data point of the sub-set being greater than a first threshold distance away from the plane;
      projecting the candidate ground plane data points of the sub-set onto the plane to provide projected data points;
      calculating a distance between each of the projected data points;
      eliminating projected data points from the candidate ground plane data points when the distance between the projected data points is less than a second threshold distance; and iteratively fitting, defining, projecting, calculating, and eliminating until convergence, wherein the plane is identified as the ground plane upon convergence;

creating from the plurality of data points a first subset of data points that are above the ground plane;

identifying a second subset of data points associated with an object in the scene, from the first subset of data points;

identifying a plurality of features associated with the second subset of data points and determining a signature for the identified plurality of features; and classifying the second set of data points according to a correspondence between the signature and a reference signature.

2. The computer-implemented method of claim 1, wherein creating the first subset of data points comprises extracting the candidate ground plane data points from the plurality of data points to create the first subset of data points.

3. The computer-implemented method of claim 2, wherein identifying the ground plane comprises a) determining, using the plane, a probability that the projected data points are associated with the ground plane in the scene; and b) removing the projected data points from the candidate ground plane data points whose corresponding determined probability is lower than a threshold probability.

4. The computer-implemented method of claim 3, further comprising repeating actions a) and b) a predetermined number of times.

5. The computer-implemented method of claim 3, further comprising repeating actions a) and b) until a current fitted plane is within a threshold distance of a previously fitted plane.

6. The computer-implemented method of claim 3, further comprising translating coordinates of data points in the plurality of data points from a global coordinate frame to a local coordinate frame.

7. The computer-implemented method of claim 6, wherein the plurality of data points correspond to a single one of multiple contiguous segments of data points, each contiguous segment comprising data points for a corresponding contiguous portion of the scene; wherein the local coordinate frame corresponds to the single one segment.

8. The computer-implemented method of claim 6, wherein identifying candidate ground plane data points comprises identifying data points having coordinates within a predetermined range of coordinates in the local coordinate frame.

9. The computer-implemented method of claim 3, wherein identifying the ground plane further comprises determining that the probability of an individual candidate ground plane data point being associated with the ground plane is low when the distance corresponding with the individual candidate ground plane data point is less than the second threshold distance.

10. The computer-implemented method of claim 1, wherein identifying the second subset of data points comprises identifying each data point in the first subset of data points that is as close or closer than an additional threshold distance to at least one other data point in the first subset of data points.

11. The computer-implemented method of claim 10, wherein receiving the plurality of data points comprises receiving the plurality of data points from one of multiple contiguous segments of data points, each contiguous segment comprising data points for a corresponding contiguous portion of the scene.

12. The computer-implemented method of claim 11, further comprising identifying additional data points in a segment that is contiguous to the one of multiple contiguous segments, wherein the additional data points are determined to also be associated with the object in the scene; and including the additional data points in the second subset of data points.

13. The computer-implemented method of claim 12, further comprising translating coordinates of data points in contiguous segments from respective local coordinate frames to a single global coordinate frame.

14. The computer-implemented method of claim 1, wherein identifying a plurality of features comprises calculating a plurality of spin-images for corresponding data points in the second subset.

15. The computer-implemented method of claim 14, wherein calculating a plurality of spin-images comprises randomly or pseudo-randomly selecting a predetermined number of data points in the second subset of data points and calculating a spin-image for each randomly or pseudo-randomly selected data point.

16. The computer-implemented method of claim 15, wherein the predetermined number is in the range of about 500 to 1000.

17. The computer-implemented method of claim 15, wherein the predetermined number is in the range of about 10% to 50% of a number of data points in the second subset.

18. The computer-implemented method of claim 15, wherein the predetermined number is about 1000 if there are more than about 1000 data points in the second subset, and if there are less than about 1000 data points in the second subset then spin-images are calculated for each data point in the second subset.

19. The computer-implemented method of claim 15, wherein determining a signature comprises employing k-means clustering to calculate a predetermined number of centroids and corresponding cluster weights corresponding to the plurality of spin images.

20. The computer-implemented method of claim 19, wherein the predetermined number of centroids is between about 10 and 50.

21. The computer-implemented method of claim 20, wherein the predetermined number of centroids is about 40.

22. The computer-implemented method of claim 19, wherein the predetermined number of centroids is more than 1000.

23. The computer-implemented method of claim 19, further comprising normalizing the cluster weights.

24. The computer-implemented method of claim 1, wherein classifying the second set of data points comprises calculating a chi-square distance between the calculated signature and the reference signature; the computer-implemented method further comprising determining that the calculated signature and the reference signature correspond when the calculated chi-square distance is less than an additional threshold distance.

25. The computer-implemented method of claim 1, wherein classifying the second set of data points comprises calculating an earth mover's distance (EMD) between the calculated signature and the reference signature.

26. The computer-implemented method of claim 25, further comprising determining that the calculated signature and the reference signature correspond when the calculated EMD is less than an additional threshold distance.

27. The computer-implemented method of claim 25, further comprising calculating a kernel matrix, wherein entries in the kernel matrix correspond to an EMD between the calculated signature and each of a plurality of reference signatures.

28. The computer-implemented method of claim 27, further comprising employing the kernel matrix in a support vector machine to classify the second set of data points.

29. The computer-implemented method of claim 28, further comprising providing training data to train the support vector machine.

30. The computer-implemented method of claim 29, further comprising calculating a confusion matrix for a plurality of different classifications corresponding to the support vector machine, and providing additional training data, based on values in the confusion matrix, to enable the support vector machine to more accurately classify sets of data points.

31. The computer-implemented method of claim 1, wherein projecting further comprises translating the candidate ground plane data points in a direction normal to the ground plane.

32. A computing system for classifying image data, the system comprising:
a memory storing instructions;
a processor configured to execute the instructions to perform operations comprising:
receiving a plurality of data points corresponding to three-dimensional image data;
mapping the plurality of data points to a local coordinate frame, the local coordinate frame defining a plane;
identifying a ground plane in a scene represented by the plurality of data points by:
determining candidate ground plane data points from the plurality of data points;
fitting a plane to the candidate ground plane data points;
defining a sub-set of the candidate ground plane data points, each candidate ground plane data point of the sub-set being greater than a first threshold distance away from the plane;
projecting the candidate ground plane data points of the sub-set onto the plane to provide projected data points;
calculating a distance between each of the projected data points;
eliminating projected data points from the candidate ground plane data points when the distance between the projected data points is less than a second threshold distance; and
iteratively fitting, defining, projecting, calculating, and eliminating until convergence, wherein the plane is identified as the ground plane upon convergence;
creating from the plurality of data points a first subset of data points that are above the ground plane;
identifying a second subset of data points associated with an object in the scene, from the first subset of data points;
identifying a plurality of features associated with the second subset of data points and determining a signature for the identified plurality of features; and
classifying the second set of data points according to a correspondence between the signature and a reference signature.

33. The computing system of claim 32, wherein creating the first subset of data points comprises extracting the candidate ground plane data points from the plurality of data points to create the first subset of data points.

34. The computing system of claim 33, wherein identifying the ground plane comprises a) determining, using the plane, a probability that the projected data points are associated with the ground plane in the scene; and b) removing the projected data points from the candidate ground plane data points whose corresponding determined probability is lower than a threshold probability.

35. The computing system of claim 34, further comprising repeating actions a) and b) a predetermined number of times.

36. The computing system of claim 34, further comprising repeating actions a) and b) until a current fitted plane is within a threshold distance of a previously fitted plane.

37. The computing system of claim 34, further comprising translating coordinates of data points in the plurality of data points from a global coordinate frame to a local coordinate frame.

38. The computing system of claim 37, wherein the plurality of data points correspond to a single one of multiple contiguous segments of data points, each contiguous segment comprising data points for a corresponding contiguous portion of the scene; wherein the local coordinate frame corresponds to the single one segment.

39. The computing system of claim 37, wherein identifying candidate ground plane data points comprises identifying data points having coordinates within a predetermined range of coordinates in the local coordinate frame.

40. The computing system of claim 34, wherein identifying the ground plane further comprises determining that the probability of an individual candidate ground plane data point being associated with the ground plane is low when the distance corresponding with the individual candidate ground plane data point is less than the second threshold distance.

41. The computing system of claim 32, wherein identifying the second subset of data points comprises identifying each data point in the first subset of data points that is as close or closer than an additional threshold distance to at least one other data point in the first subset of data points.

42. The computing system of claim 41, wherein receiving the plurality of data points comprises receiving the plurality of data points from one of multiple contiguous segments of data points, each contiguous segment comprising data points for a corresponding contiguous portion of the scene.

43. The computing system of claim 42, further comprising identifying additional data points in a segment that is contiguous to the one of multiple contiguous segments, wherein the additional data points are determined to also be associated with the object in the scene; and including the additional data points in the second subset of data points.

44. The computing system of claim 43, further comprising translating coordinates of data points in contiguous segments from respective local coordinate frames to a single global coordinate frame.

45. The computing system of claim 32, wherein identifying a plurality of features comprises calculating a plurality of spin-images for corresponding data points in the second subset.

46. The computing system of claim 45, wherein calculating a plurality of spin-images comprises randomly or pseudo-randomly selecting a predetermined number of data points in the second subset of data points and calculating a spin-image for each randomly or pseudo-randomly selected data point.

47. The computing system of claim 46, wherein the predetermined number is about 1000 if there are more than about 1000 data points in the second subset, and if there are less than about 1000 data points in the second subset then spin-images are calculated for each data point in the second subset.

48. The computing system of claim 45, wherein determining a signature comprises employing k-means clustering to calculate a predetermined number of centroids and corresponding cluster weights corresponding to the plurality of spin images.

49. The computing system of claim 48, further comprising normalizing the cluster weights.

50. The computing system of claim 32, wherein classifying the second set of data points comprises calculating a chi-square distance between the calculated signature and the reference signature; the computer-implemented method further comprising determining that the calculated signature and the reference signature correspond when the calculated chi-square distance is less than an additional threshold distance.

51. The computing system of claim 32, wherein classifying the second set of data points comprises calculating an earth mover's distance (EMD) between the calculated signature and the reference signature.

52. The computing system of claim 51, further comprising determining that the calculated signature and the reference signature correspond when the calculated EMD is less than an additional threshold distance.

53. The computing system of claim 51, further comprising calculating a kernel matrix, wherein entries in the kernel matrix correspond to an EMD between the calculated signature and each of a plurality of reference signatures.

54. The computing system of claim 53, further comprising employing the kernel matrix in a support vector machine to classify the second set of data points.

55. The computing system of claim 54, further comprising providing training data to train the support vector machine.

56. The computing system of claim 55, further comprising calculating a confusion matrix for a plurality of different classifications corresponding to the support vector machine, and providing additional training data, based on values in the confusion matrix, to enable the support vector machine to more accurately classify sets of data points.

57. The computing system of claim 32, wherein projecting further comprises translating the candidate ground plane data points in a direction normal to the ground plane.

* * * * *

UNITED STATES PATENT AND TRADEMARK OFFICE
CERTIFICATE OF CORRECTION

PATENT NO.        : 7,995,055 B1                                           Page 1 of 1
APPLICATION NO.   : 11/753859
DATED             : August 9, 2011
INVENTOR(S)       : Xiaoxu Ma et al.

It is certified that error appears in the above-identified patent and that said Letters Patent is hereby corrected as shown below:

Title Page, Column 2, under Other Publications, line 15, delete "matteuce" and insert
-- matteucc --.

Signed and Sealed this
First Day of November, 2011

David J. Kappos
*Director of the United States Patent and Trademark Office*